May 19, 1942.                M. E. JOHNSON                2,283,810
                              CONTROL VALVE
                            Filed May 6, 1940
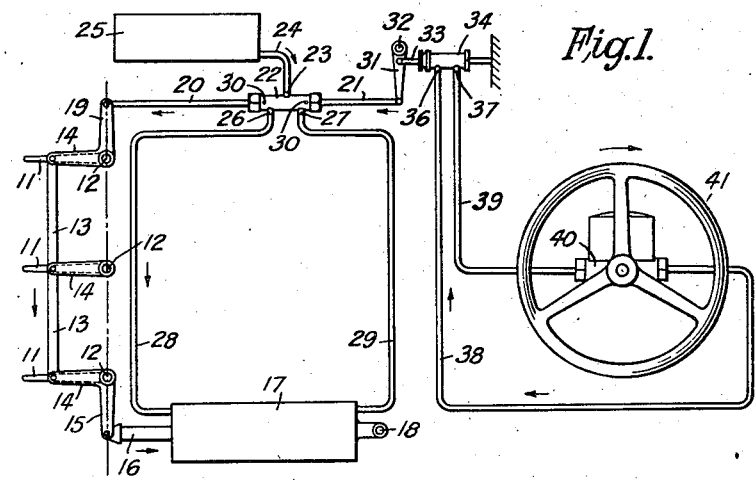
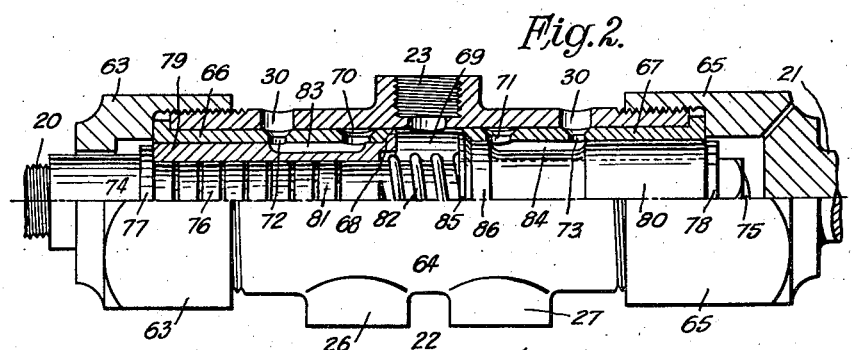
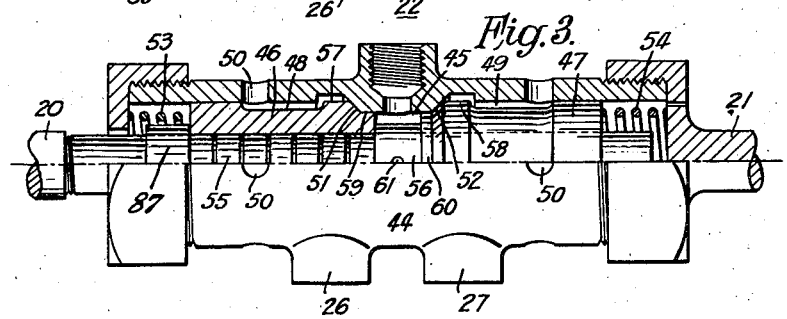
Inventor
MALCOLM EDWARD JOHNSON Patented May 19, 1942

2,283,810

UNITED STATES PATENT OFFICE 2,283,810

CONTROL VALVE

Malcolm Edward Johnson, Wembley, England, assignor to The British Power Boat Company Limited, Hythe, Southampton, England, a British joint-stock company Application May 6, 1940, Serial No. 333,643
In Great Britain July 28, 1939

5 Claims. (Cl. 121—41)

This invention relates to control valves for servomotors employing fluid pressure or vacuum, for example in the operation of steering gear for boats, road vehicles and aircraft, the valve being capable of admitting the pressure or vacuum to either end of a double-acting servomotor cylinder or to either of two single-acting cylinders for operating the steering gear in the desired direction.

The invention has for its main object to provide an improved control valve, particularly applicable to servomotors for steering gear and other mechanism requiring positive operation in each direction, as by a double-acting servomotor, and intended chiefly for servomotors employing fluid under relatively high pressure.

Another object of the invention is to provide an improved control valve adapted for interposition in the connections between manual, automatic or other operating means and the rudder or other part to be operated, so that the valve will be actuated by an initial relative movement of the said connections.

Other objects and advantages of the invention will appear from the following description given with reference to the accompanying drawing, in which:

Fig. 1 is a diagram showing the general arrangement of a servomotor steering gear.

Fig. 2 is a part-sectional elevation of the improved control valve in one embodiment.

Fig. 3 is a similar view of another construction of the improved control valve.

Referring to Fig. 1, which illustrates a servomotor steering gear for a high-speed power boat having three rudders 11, mounted on separate vertical spindles 12 linked together by a jointed bar 13 attached to the tillers 14, the spindle of the starboard rudder is provided with a master tiller arm 15 jointed to the piston rod 16 of a double-acting servomotor cylinder 17; this cylinder may be mounted upon a swivelling support 18 at the end remote from the master tiller arm 15, so that it can oscillate upon its support to allow for the radial motion of the tiller arm.

The port rudder spindle 12 is provided with an auxiliary arm 19 jointed to a divided connecting rod 20—21, between the two parts of which there is interposed a control valve 22, the elements of which are actuated to open or close the valve by a small relative movement of the two parts 20—21 of the divided connecting rod. At about the center of the length of the outer element or casing of the control valve 22, there is provided a lateral branch 23 to which is fitted a flexible pipe 24 connected to a pressure tank 25 which is kept filled with compressed air by any convenient means. Two other lateral branches 26—27 upon the valve casing, located at equal distances axially from the pressure branch 23, are connected by flexible pipes 28—29 to the respective ends of the servomotor cylinder 17; beyond these two lateral branches, holes 30 are drilled through the walls of the valve casing to allow escape of air, these holes and the several lateral branches being controlled by the valve. In the normal position, the air pressure from the tank 25 is applied to the central lateral branch 23, but the two outer branches 26—27 connected to the opposite ends of the servomotor cylinder 17 are shut off from the air pressure and opened to the atmosphere.

The part 21 of the divided connecting rod, attached to the valve casing, is jointed to the end of a swinging lever 31, pivoted at 32 and having a second rod or link 33 jointed thereto at a point intermediate in its length; the link 33 is connected to an actuating jack or ram comprising (as shown) a movable cylinder 34 mounted upon a fixed piston, or alternatively a piston movable within a fixed cylinder. Two lateral branches 36—37 upon this cylinder, communicating with the interior on opposite sides of the piston, are connected by flexible pipes 38—39 to the respective sides of a pump mechanism 40 operated by the steering wheel 41, so that movement of the latter will produce displacement of liquid on one side of the pump into one of the pipes 38—39. For example, by turning the wheel 41 in a clockwise direction as indicated by the arrows, liquid pressure can thus be transmitted from the pump 40 through the pipe 38 to the left-hand end of the ram cylinder 34, causing it to swing the lever 31 to the left and thereby actuating the control valve 22 by means of the part 21 of the divided connecting rod, for the application of compressed air from the tank 25 by way of the pipes 24—28 to the left-hand end of the servomotor 17 so as to produce the desired steering movement of the rudders 11, viz. to starboard; such movement causes the auxiliary arm 19 to displace the part 20 of the divided connecting rod attached to the inner element of the control valve, so that the valve will resume its normal condition, shutting off the pressure from the servomotor as soon as the rudder movement corresponding to the turning of the steering wheel 41 has been completed. Further or contrary turning of the wheel will again admit liquid pressure to the ram cylinder 34, causing a fresh movement of the control valve and bringing the servomotor into operation once more.

Fig. 2 shows the preferred construction of the improved control valve 22 which is interposed in the manual connections 20—21 to the tiller arm 19; the part 20 of the divided connecting rod extends through a centrally apertured cap 63 at one end of the control valve casing 64, while the other part 21 is secured to the opposite end of the casing by means of a screw cap 65. These two caps 63—65 serve also to retain a pair of flanged liners 66—67 fitting tightly within the bore of the casing 64, the adjacent inner ends of the liners being bevelled inwardly, for example at 45 degrees, as indicated at 68, and leaving between them an annular space 69 which forms an enlargement of the bore. This space is in constant communication with the pressure branch 23 of the valve casing; the liners are provided with rings of ports 70—71 respectively communicating with the other lateral branches 26—27 of the casing, and with rings of ports 72—73 communicating with the atmospheric or escape holes 30.

The part 20 of the divided connecting rod is screwed to a thimble or coupling 74 to which there is secured by means of a long screw 75 a cylindrical guide member 76 of a length slightly greater than the total length of the two liners 66—67 and the annular space 69 the member 76 being held between two collars or washers 77—78 of the larger diameter fitted upon the screw 75.

Two annular pistons or sleeves 79—80 are slidably mounted within the liners 66—67, each being also a sliding fit upon one end of the guide member 76, which may be provided with oil-grooves 81 to prevent leakage along the interior of the pistons; the adjacent ends of the pistons are engaged by a coiled spring 82 so that the two pistons are urged apart towards the collars 77—78 on the guide member. The external periphery of each piston is grooved circumferentially at 83—84 respectively for a length greater than the spacing of the corresponding lateral ports 70—72 and 71—73 in the liners, the two ends of the servomotor cylinder being thereby placed normally in communication with the atmosphere; the inner ends of the pistons, beyond their external grooves, are bevelled outwardly, for example at 45 degrees, to form mushroom heads 85 of a diameter sufficient to seat upon the bevelled inner ends of the liners 66—67, but less than that of the bore of the casing, these mushroom heads being provided with narrow cylindrical faces 86 adapted to fit in the interior of the liners.

The outer extremities of the pistons are adapted to abut against the collars 77—78 on the guide member, but a small amount of clearance for the sake of expansion is allowed in the axial direction, the outward movement of the pistons being limited by their bevelled heads 85 seating upon the bevelled ends of the liners 66—67. Due to this bevelled seating, the two pistons provide a pressure-tight closure to prevent leakage from the space 69 at the middle of the casing to either end of the servomotor cylinder or to the atmosphere; when however, either piston 79 or 80 is lifted from its seating by relative movement of the two parts 20—21 of the divided connecting rod in steering the boat, the narrow cylindrical face 86 of the piston remains within the bore of the liner, so as to prevent or obstruct the leakage of pressure, until after the external groove 83 or 84 upon the piston has moved clear of the port 72 or 73 in the liner, the passage being opened only when the inner end of the groove 83 or 84 emerges from the bevelled end of the liner. During this movement, the other piston 80 or 79 remains in normal position, with its bevelled face held upon the seating but its external groove 84 or 83 allowing the opposite end of the servomotor cylinder to exhaust freely to the atmosphere by way of the lateral ports. As soon as the servomotor has effected the desired steering movement, determined by the manual steering mechanism, the two parts 20—21 of the divided connecting rod resume their normal relative position, both pistons 79—80 being then seated to shut off the admission of pressure fluid to the servomotor.

In another form of construction of the valve, as illustrated in Fig. 3, the valve casing 44 has its bore restricted by a central neck or inserted sleeve 45 at the position of the power port 23, two pistons 46—47 being slidable within the casing on opposite sides of the restricted portion; each piston is grooved circumferentially at 48—49 respectively to allow communication of the servomotor ports 26—27 with the atmosphere or exhaust by way of holes 50 in the side walls of the casing. The adjacent ends of the pistons are formed with bevelled faces 51—52 respectively seating on opposite sides of the restricted neck portion 45 under the action of coiled springs 53—54 mounted at their outer ends, and two pistons are traversed axially by a guide member 55 operated by relative movement of the two parts 20—21 of the divided connecting rod, as already described with reference to Fig. 1. The guide member is shown secured as by screw threads to the port 20 of the divided connecting rod, the relative movement of the two parts 20—21 being limited in this direction by a loose collar 87 encircling the guide member 55. The latter is provided with a central collar 56 fitting with slight axial clearance between the two pistons, this collar being secured by a diametrically arranged pin 61 and thus adapted to engage either piston 46 or 47 for lifting the bevelled end from its seating and for disconnecting the servomotor and exhaust ports controlled by that piston. During this movement of the piston, a cylindrical facing 57 or 58 acts to shut off the servomotor port 26 or 27 from the exhaust holes prior to the admission of compressed air from the power port 23, which is delayed by a second cylindrical facing 59 or 60 fitting within the restricted neck portion 45.

The improved control valve may be applied to servomotors employing any suitable fluid under pressure, or even to vacuum servomotors in cases where slight leakage in the normal position of the valve may be objectionable, the bevelled valve faces at the ends of the pistons providing a more certain cut-off than ports controlled by external grooves upon the pistons.

What I claim is:

1. A servomotor control valve, comprising a casing having two ports for communication with two sides of the servomotor and two ports for communication with the exhaust, two pistons slidable coaxially within said casing, said pistons having peripheral surfaces controlling communication between the respective servomotor and exhaust ports, valve faces upon said pistons, a power port between said valve faces, valve seatings on opposite sides of said power port, and means for shifting either of said pistons so as to disconnect the respective servomotor and exhaust ports and to lift the respective valve face from its seating, said piston-shifting means including abutments engaging with the respective ends of said casing to limit the movements of said pistons in relation to said casing.

2. A servomotor control valve, comprising a casing, two liners fitted to opposite ends of said casing, said casing having a port located between the adjacent ends of said liners for communication with a source of power, said casing and liners having other ports for communication respectively with two sides of the servomotor and with exhaust, two pistons slidable co-axially within said liners and casing, said pistons having circumferential grooves for connecting respective servomotor and exhaust ports, valve heads upon adjacent ends of said pistons, valve seatings upon the ends of said liners, spring means urging said pistons apart to press said valve heads upon said seatings, and means for shifting either of said pistons towards the other so as to disconnect the respective servomotor and exhaust ports and to lift the respective valve head from its seating.

3. A servomotor control valve, comprising a cylindrical casing, two axially-spaced liners fitted within opposite ends of said casing, said casing having a single lateral port opening into the space between said liners, two pistons slidable within said liners, said pistons including valve heads at their adjacent ends, valve seatings upon the inner ends of said liners, a spring interposed between said pistons to press said valve heads upon said seatings, said casing and liners having lateral ports connected in pairs by circumferential grooves upon the exterior of said pistons, and means for shifting either of said pistons towards the other so as to disconnect one pair of said lateral ports and to lift the respective valve head from its seating, thereby connecting said single lateral port to one of the disconnected pair.

4. A servomotor control valve, comprising a cylindrical casing, two axially-spaced liners fitted within opposite ends of said casing, said casing having a lateral port opening into the space between said liners, two pistons slidable within said liners, said pistons including valve heads at their adjacent ends, valve seatings upon the inner ends of said liners, a spring interposed between said pistons to press said valve heads upon said seatings, said casing and liners having lateral ports connected in pairs by circumferential grooves upon the exterior of said pistons, and an operating member passing slidably through said pistons, said operating member including abutments for engagement with the remote ends of said pistons.

5. A servomotor control valve, comprising a casing, two liners fitted to opposite ends of said casing, said casing having a port located between the adjacent ends of said liners for communication with a source of power, said casing and liners having other ports for communication respectively with two sides of the servomotor and with exhaust, two pistons slidable co-axially within said liners and casing, said pistons controlling communication between the respective servomotor and exhaust ports, valve heads upon adjacent ends of said pistons, valve seatings upon the adjacent ends of said liners, and means for shifting either of said pistons so as to disconnect the respective servomotor and exhaust ports and to lift the respective valve head from its seating.

MALCOLM EDWARD JOHNSON.